(12) United States Patent
Hohmann, Jr.

(10) Patent No.: US 8,516,763 B2
(45) Date of Patent: Aug. 27, 2013

(54) THERMALLY ISOLATING TUBULE FOR WALL ANCHOR

(75) Inventor: Ronald P. Hohmann, Jr., Hauppauge, NY (US)

(73) Assignee: MiTek Holdings, Inc., Wilmington, DE (US)

( * ) Notice: Subject to any disclaimer, the term of this patent is extended or adjusted under 35 U.S.C. 154(b) by 40 days.

(21) Appl. No.: 13/152,138

(22) Filed: Jun. 2, 2011

(65) Prior Publication Data

US 2012/0308330 A1 Dec. 6, 2012

(51) Int. Cl.
*E04B 1/38* (2006.01)

(52) U.S. Cl.
USPC ............... 52/506.05; 52/383; 52/513; 52/714

(58) Field of Classification Search
USPC ............. 52/506.05, 714, 565, 383, 379, 508, 52/513, 713, 506.01
See application file for complete search history.

(56) References Cited

U.S. PATENT DOCUMENTS

| | | | | |
|---|---|---|---|---|
| 1,714,411 A * | 5/1929 | Walter | ............... | 52/714 |
| 2,058,148 A * | 10/1936 | Hard | ............... | 52/714 |
| 2,966,705 A * | 1/1961 | Massey | ............ | 52/489.2 |
| 3,377,764 A * | 4/1968 | Storch | ............. | 52/713 |
| 3,523,395 A * | 8/1970 | Konrad et al. | .......... | 52/410 |
| 3,786,605 A * | 1/1974 | Winfrey | ............... | 52/235 |
| 4,021,990 A * | 5/1977 | Schwalberg | ............... | 52/479 |
| 4,107,890 A * | 8/1978 | Seghezzi et al. | ............ | 52/379 |
| 4,305,239 A * | 12/1981 | Geraghty | ............... | 52/715 |
| 4,329,823 A * | 5/1982 | Simpson | .......... | 52/407.4 |
| 4,373,314 A * | 2/1983 | Allan | ............... | 52/434 |
| 4,438,611 A * | 3/1984 | Bryant | ............... | 52/309.2 |
| 4,473,984 A * | 10/1984 | Lopez | ............... | 52/410 |
| 4,598,518 A * | 7/1986 | Hohmann | ............... | 52/410 |
| 4,764,069 A * | 8/1988 | Reinwall et al. | ............... | 411/397 |
| 4,869,038 A * | 9/1989 | Catani | ............... | 52/410 |
| 4,869,043 A * | 9/1989 | Hatzinikolas et al. | ............ | 52/712 |
| 4,875,319 A * | 10/1989 | Hohmann | ............... | 52/383 |
| 5,063,722 A | 11/1991 | Hohmann | | |
| 5,392,581 A | 2/1995 | Hatzinikolas et al. | | |
| 5,408,798 A | 4/1995 | Hohmann | | |
| 5,454,200 A * | 10/1995 | Hohmann | ............... | 52/513 |
| 5,456,052 A | 10/1995 | Anderson et al. | | |
| 5,644,889 A * | 7/1997 | Getz | ............... | 52/713 |
| 5,671,578 A * | 9/1997 | Hohmann | ............... | 52/562 |
| 5,816,008 A | 10/1998 | Hohmann | | |
| D406,524 S * | 3/1999 | Steenson et al. | ............ | D8/397 |
| 6,128,883 A * | 10/2000 | Hatzinikolas | ............ | 52/698 |

(Continued)

FOREIGN PATENT DOCUMENTS

| | | |
|---|---|---|
| CH | 279209 | 3/1952 |
| GB | 2069024 | 8/1981 |

*Primary Examiner* — William Gilbert
*Assistant Examiner* — James Ference
(74) *Attorney, Agent, or Firm* — Senniger Powers LLP

(57) ABSTRACT

A tubule assembly for thermally isolating a surface-mounted wall anchor and an anchoring system employing the same are disclosed. The thermally-isolated tubule assembly is adaptable to varied anchor structures and for use with interlocking veneer ties and reinforcement wires to provide a high-strength surface mounted anchoring system for cavity walls. The stepped cylinders sheath the mounting hardware to limit insulation tearing and resultant loss of insulation integrity. The tubule assembly is thermally-isolated through the use of a series of strategically placed compressible nonconductive fittings and set within the perimeter of the anchor base. Seals are formed which preclude penetration of air, moisture, and water vapor into the wall structure.

7 Claims, 3 Drawing Sheets

(56) References Cited

U.S. PATENT DOCUMENTS

| | | | |
|---|---|---|---|
| 6,131,360 A * | 10/2000 | Dalen | 52/712 |
| 6,209,281 B1 | 4/2001 | Rice | |
| 6,279,283 B1 | 8/2001 | Hohmann et al. | |
| 6,318,941 B1 * | 11/2001 | Guenther | 411/342 |
| 6,332,300 B1 * | 12/2001 | Wakai | 52/713 |
| 6,401,406 B1 * | 6/2002 | Komara | 52/127.3 |
| 6,502,362 B1 * | 1/2003 | Zambelli et al. | 52/698 |
| 6,802,675 B2 * | 10/2004 | Timmons et al. | 405/284 |
| 7,114,900 B2 * | 10/2006 | Toosky | 411/108 |
| 7,225,590 B1 * | 6/2007 | diGirolamo et al. | 52/379 |
| 7,334,374 B2 * | 2/2008 | Schmid | 52/361 |
| 7,404,274 B2 * | 7/2008 | Hayes | 52/513 |
| 7,415,803 B2 | 8/2008 | Bronner | |
| 7,421,826 B2 * | 9/2008 | Collins et al. | 52/302.1 |
| 7,562,506 B2 | 7/2009 | Hohmann, Jr. | |
| 7,717,015 B2 * | 5/2010 | Nilsen et al. | 81/176.2 |
| 7,845,137 B2 | 12/2010 | Hohmann, Jr. | |
| 2004/0003558 A1 * | 1/2004 | Collins et al. | 52/302.1 |
| 2005/0279042 A1 * | 12/2005 | Bronner | 52/513 |
| 2010/0037552 A1 | 2/2010 | Bronner | |
| 2011/0041442 A1 * | 2/2011 | Bui | 52/483.1 |
| 2011/0083389 A1 * | 4/2011 | Bui | 52/483.1 |

\* cited by examiner

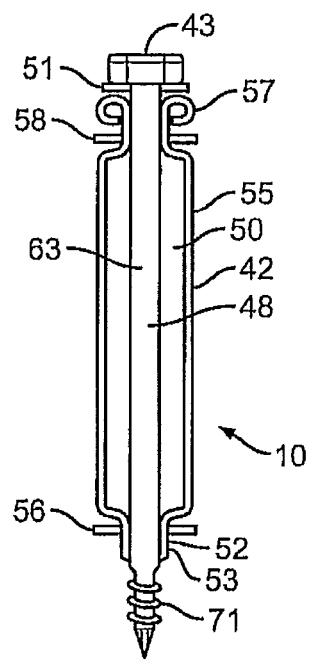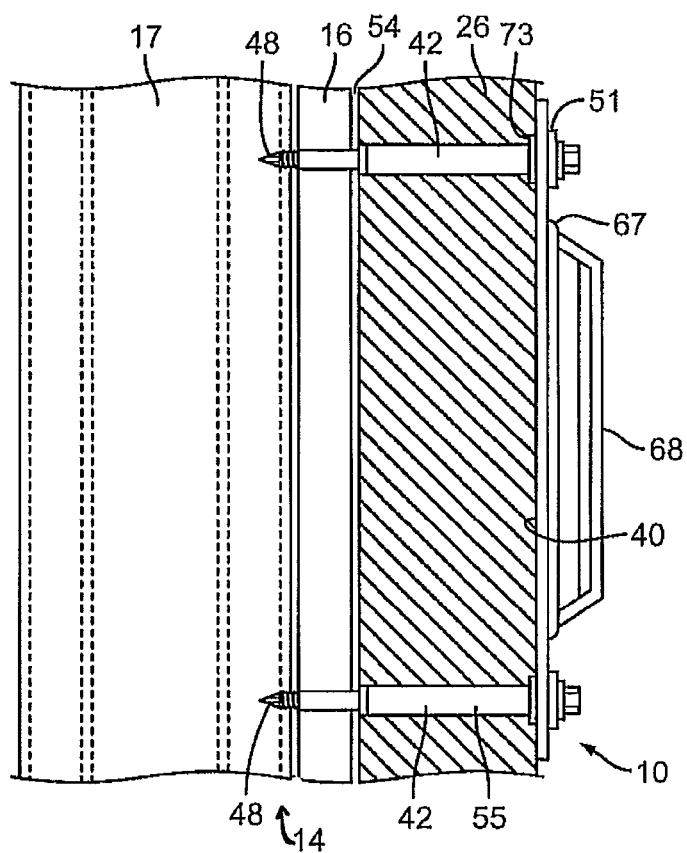
FIG. 1
FIG. 2

THERMALLY ISOLATING TUBULE FOR WALL ANCHOR

BACKGROUND OF THE INVENTION

1. Field of the Invention

This invention relates a tubule assembly for thermally-isolating wall anchors for securement within the inner wythe of a cavity wall and for connection to veneer ties that comprise positive interlocking components of an anchoring system. The assembly has application to seismic-resistant structures and to cavity walls having special requirements. The latter include high-strength requirements for both insulated and non-insulated cavities, namely, a structural performance characteristic capable of withstanding a 100 lbf, in both tension and compression.

2. Description of the Prior Art

In the late 1980's, surface-mounted wall anchors were developed by Hohmann & Barnard, Inc., a MiTEK-Berkshire Hathaway Corporation, and patented under U.S. Pat. No. 4,598,518. The invention was commercialized under trademarks DW-10®, DW-10-X®, and DW-10-HS®. These widely accepted building specialty products were designed primarily for dry-wall construction, but were also used with masonry backup walls. For seismic applications, it was common practice to use these wall anchors as part of the DW-10® Seismiclip® interlock system which added a Byna-Tie® wire formative, a Seismiclip® snap-in device—described in U.S. Pat. No. 4,875,319 ('319), and a continuous wire reinforcement.

In an insulated dry wall application, the surface-mounted wall anchor of the above-described system has pronged legs that pierce the insulation and the wallboard and rest against the metal stud to provide mechanical stability in a four-point landing arrangement. The vertical slot of the wall anchor enables the mason to have the wire tie adjustably positioned along a pathway of up to 3.625-inch (max.). The interlock system served well and received high scores in testing and engineering evaluations which examined effects of various forces, particularly lateral forces, upon brick veneer masonry construction. However, under certain conditions, the system did not sufficiently maintain the integrity of the insulation. Also, upon the promulgation of more rigorous specifications by which tension and compression characteristics were raised, a different structure—such as one of those described in detail below—was required.

The engineering evaluations further described the advantages of having a continuous wire embedded in the mortar joint of anchored veneer wythes. The seismic aspects of these investigations were reported in the inventor's '319 patent. Besides earthquake protection, the failure of several high-rise buildings to withstand wind and other lateral forces resulted in the incorporation of a continuous wire reinforcement requirement in the Uniform Building Code provisions. The use of a continuous wire in masonry veneer walls has also been found to provide protection against problems arising from thermal expansion and contraction and to improve the uniformity of the distribution of lateral forces in the structure.

Shortly after the introduction of the pronged wall anchor, a seismic veneer anchor, which incorporated an L-shaped backplate, was introduced. This was formed from either 12- or 14-gauge sheetmetal and provided horizontally disposed openings in the arms thereof for pintle legs of the veneer anchor. In general, the pintle-receiving sheetmetal version of the Seismiclip® interlock system served well, but in addition to the insulation integrity problem, installations were hampered by mortar buildup interfering with pintle leg insertion.

In the 1980's, an anchor for masonry veneer walls was developed and described in U.S. Pat. No. 4,764,069 by Reinwall et al., which patent is an improvement of the masonry veneer anchor of Lopez, U.S. Pat. No. 4,473,984. Here the anchors are keyed to elements that are installed using power-rotated drivers to deposit a mounting stud in a cementitious or masonry backup wall. Fittings are then attached to the stud which include an elongated eye and a wire tie therethrough for disposition in a bed joint of the outer wythe. It is instructive to note that pin-point loading—that is forces concentrated at substantially a single point—developed from this design configuration. This resulted, upon experiencing lateral forces over time, in the loosening of the stud.

Exemplary of the public sector building specification is that of the Energy Code Requirement, Boston, Mass. (see Chapter 13 of 780 CMR, Seventh Edition). This Code sets forth insulation R-values well in excess of prior editions and evokes an engineering response opting for thicker insulation and correspondingly larger cavities. Here, the emphasis is upon creating a building envelope that is designed and constructed with a continuous air barrier to control air leakage into or out of conditioned space adjacent the inner wythe.

As insulation became thicker, the tearing of insulation during installation of the pronged DW-10X® wall anchor, see supra, became more prevalent. This occurred as the installer would fully insert one side of the wall anchor before seating the other side. The tearing would occur at two times, namely, during the arcuate path of the insertion of the second leg and separately upon installation of the attaching hardware. The gapping caused in the insulation permitted air and moisture to infiltrate through the insulation along the pathway formed by the tear. While the gapping was largely resolved by placing a self-sealing, dual-barrier polymeric membrane at the site of the legs and the mounting hardware, with increasing thickness in insulation, this patchwork became less desirable. The improvements hereinbelow in surface mounted wall anchors look toward greater insulation integrity and less reliance on a patch.

Another prior art development occurred shortly after that of Reinwall/Lopez when Hatzinikolas and Pacholok of Fero Holding Ltd. introduced their sheetmetal masonry connector for a cavity wall. This device is described in U.S. Pat. Nos. 5,392,581 and 4,869,043. Here a sheetmetal plate connects to the side of a dry wall column and protrudes through the insulation into the cavity. A wire tie is threaded through a slot in the leading edge of the plate capturing an insulative plate thereunder and extending into a bed joint of the veneer. The underlying sheetmetal plate is highly thermally conductive, and the '581 patent describes lowering the thermal conductivity by foraminously structuring the plate. However, as there is no thermal break, a concomitant loss of the insulative integrity results.

Focus on the thermal characteristics of cavity wall construction is important to ensuring minimized heat transfer through the walls, both for comfort and for energy efficiency of heating and air conditioning. When the exterior is cold relative to the interior of a heated structure, heat from the interior should be prevented from passing through to the outside. Similarly, when the exterior is hot relative to the interior of an air conditioned structure, heat from the exterior should be prevented from passing through to the interior. Providing a seal at the insertion points of the mounting hardware assists in controlling heat transfer.

In recent building codes for masonry structures, a trend away from eye and pintle structures is seen in that the newer codes require adjustable anchors be detailed to prevent disengagement. This has led to anchoring systems in which the open end of the veneer tie is embedded in the corresponding bed joint of the veneer precluding disengagement by vertical displacement.

Another application for high-span anchoring systems is in the evolving technology of self-cooling buildings. Here, the cavity wall serves additionally as a plenum for delivering air from one area to another. While this technology has not seen wide application in the United States, the ability to size cavities to match air moving requirements for naturally ventilated buildings enable the architectural engineer to now consider cavity walls when designing structures in this environmentally favorable form.

In the past, the use of wire formatives have been limited by the mortar layer thicknesses which, in turn are dictated either by the new building specifications or by pre-existing conditions, e.g. matching during renovations or additions in the existing mortar layer thickness. While arguments have been made for increasing the number of the fine-wire anchors per unit area of the facing layer, architects and architectural engineers have favored wire formative anchors of sturdier wire. On the other hand, contractors find that heavy wire anchors, with diameters approaching the mortar layer height specification, frequently result in misalignment. This led to the low-profile wall anchors of the inventors as described in U.S. Pat. No. 6,279,283. However, the above-described technology did not address the adaption thereof to surface mounted devices or stud-type devices. Nor does it address the need to thermally-isolate the wall anchor.

In the course of preparing this Application, several patents, became known to the inventors hereof and are acknowledged hereby:

| Pat. | Inventor | Issue Date |
| --- | --- | --- |
| 2,058,148 | M. W. Hard | Oct. 20, 1936 |
| 2,966,705 | W. Massey | Jan. 03, 1961 |
| 3,377,764 | B. Storch | Apr. 16, 1968 |
| 4,021,990 | Schwalberg | May 10, 1977 |
| 4,305,239 | Geraghty | Dec. 15, 1981 |
| 4,373,314 | Allan | Feb. 15, 1983 |
| 4,438,611 | Bryant | Mar. 27, 1984 |
| 4,473,984 | Lopez | Oct. 02, 1984 |
| 4,598,518 | Hohmann | Jul. 08, 1986 |
| 4,869,038 | Catani | Sep. 26, 1989 |
| 4,875,319 | Hohmann | Oct. 24, 1989 |
| 5,063,722 | Hohmann | Nov. 12, 1991 |
| 5,392,581 | Hatzinikolas et al. | Feb. 28, 1995 |
| 5,408,798 | Hohmann | Apr. 25, 1995 |
| 5,456,052 | Anderson et al. | Oct. 10, 1995 |
| 5,816,008 | Hohmann | Oct. 06, 1998 |
| 6,209,281 | Rice | Apr. 03, 2001 |
| 6,279,283 | Hohmann et al. | Aug. 28, 2001 |
| 7,415,803 | Bronner | Aug. 26, 2008 |
| 7,562,506 | Hohmann, Jr. | Jul. 21, 2009 |
| 7,845,137 | Hohmann, Jr. | Dec. 07, 2010 |

| Patent App. | Inventor | Publication Date |
| --- | --- | --- |
| 2010/0037552 | Bronner | Feb. 18, 2010 |

| Foreign Patent Documents | | | |
| --- | --- | --- | --- |
| 279209 | CH | 52/714 | Mar. 01, 1952 |
| 2069024 | GB | 52/714 | Aug. 19, 1981 |

It is noted that with some exceptions these devices are generally descriptive of wire-to-wire anchors and wall ties and have various cooperative functional relationships with straight wire runs embedded in the inner and/or outer wythe.

U.S. Pat. No. 3,377,764—D. Storch—Issued Apr. 16, 1968

Discloses a bent wire, tie-type anchor for embedment in a facing exterior wythe engaging with a loop attached to a straight wire run in a backup interior wythe.

U.S. Pat. No. 4,021,990—B. J. Schwalberg—Issued May 10, 1977

Discloses a dry wall construction system for anchoring a facing veneer to wallboard/metal stud construction with a pronged sheetmetal anchor. Like Storch '764, the wall tie is embedded in the exterior wythe and is not attached to a straight wire run.

U.S. Pat. No. 4,373,314—J. A. Allan—Issued Feb. 15, 1983

Discloses a vertical angle iron with one leg adapted for attachment to a stud; and the other having elongated slots to accommodate wall ties. Insulation is applied between projecting vertical legs of adjacent angle irons with slots being spaced away from the stud to avoid the insulation.

U.S. Pat. No. 4,473,984—Lopez—Issued Oct. 2, 1984

Discloses a curtain-wall masonry anchor system wherein a wall tie is attached to the inner wythe by a self-tapping screw to a metal stud and to the outer wythe by embedment in a corresponding bed joint. The stud is applied through a hole cut into the insulation.

U.S. Pat. No. 4,869,038—M. J. Catani—Issued Sep. 26, 1989

Discloses a veneer wall anchor system having in the interior wythe a truss-type anchor, similar to Hala et al. '226, supra, but with horizontal sheetmetal extensions. The extensions are interlocked with bent wire pintle-type wall ties that are embedded within the exterior wythe.

U.S. Pat. No. 4,879,319—R. Hohmann—Issued Oct. 24, 1989

Discloses a seismic construction system for anchoring a facing veneer to wallboard/metal stud construction with a pronged sheetmetal anchor. The wall tie is distinguished over that of Schwalberg '990 and is clipped onto a straight wire run.

U.S. Pat. No. 5,392,581—Hatzinikolas et al. —Issued Feb. 28, 1995

Discloses a cavity wall anchor having a conventional tie wire for mounting in the brick veneer and an L-shaped sheetmetal bracket for mounting vertically between side-by-side blocks and horizontally atop a course of blocks. The bracket has a slit which is vertically disposed and protrudes into the cavity. The slit provides for a vertically adjustable anchor.

U.S. Pat. No. 5,408,798—Hohmann—Issued Apr. 25, 1995

Discloses a seismic construction system for a cavity wall having a masonry anchor, a wall tie, and a facing anchor. Sealed eye wires extend into the cavity and wire wall ties are threaded therethrough with the open ends thereof embedded with a Hohmann '319 (see supra) clip in the mortar layer of the brick veneer.

U.S. Pat. No. 5,456,052—Anderson et al. —Issued Oct. 10, 1995

Discloses a two-part masonry brick tie, the first part being designed to be installed in the inner wythe and then, later when the brick veneer is erected to be interconnected by the second part. Both parts are constructed from sheetmetal and are arranged on substantially the same horizontal plane.

U.S. Pat. No. 5,816,008—Hohmann—Issued Oct. 15, 1998

Discloses a brick veneer anchor primarily for use with a cavity wall with a drywall inner wythe. The device combines an L-shaped plate for mounting on the metal stud of the drywall and extending into the cavity with a T-head bent stay.

After interengagement with the L-shaped plate the free end of the bent stay is embedded in the corresponding bed joint of the veneer.

U.S. Pat. No. 6,209,281—Rice—Issued Apr. 3, 2001

Discloses a masonry anchor having a conventional tie wire for mounting in the brick veneer and sheetmetal bracket for mounting on the metal-stud-supported drywall. The bracket has a slit which is vertically disposed when the bracket is mounted on the metal stud and, in application, protrudes through the drywall into the cavity. The slit provides for a vertically adjustable anchor.

U.S. Pat. No. 6,279,283—Hohmann et al. —Issued Aug. 28, 2001

Discloses a low-profile wall tie primarily for use in renovation construction where in order to match existing mortar height in the facing wythe a compressed wall tie is embedded in the bed joint of the brick veneer.

U.S. Pat. No. 7,415,803—Bronner—Issued Aug. 26, 2008

Discloses a wing nut wall anchoring system for use with a two legged wire tie. The wing nut is rotatable in all directions to allow angular adjustment of the wire tie.

U.S. Pat. No. 7,562,506—Hohmann, Jr. —Issued Jul. 21, 2009

Discloses a notched surface-mounted wall anchor and anchoring system for use with various wire formative veneer ties. The notches, upon surface mounting of the anchor, form small wells which entrain fluids and inhibit entry of same into the wallboard.

U.S. Pat. No. 7,845,137—Hohmann, Jr. —Issued Dec. 7, 2010

Discloses a folded wall anchor and anchoring system for use with various wire formative veneer ties. The folded wall anchor enables sheathing of the hardware and sealing of the insertion points.

U.S. Pub. No. 2010/0037552—Bronner—Filed Jun. 1, 2009

Discloses a side-mounted anchoring system for veneer wall tie connection. The system transfers horizontal loads between a backup wall and a veneer wall.

None of the above provide a high-strength, surface-mounted wall anchor utilizing the thermally-isolated tubule assembly of this invention. The tubules and fasteners of the present invention provide wall anchors with thermally-isolated shaftways, which shaftways are in turn sealed to prevent fluids from flowing through or into the inner wythe. The tubule assembly is thermally-isolating and self-sealing through the use of non-conductive washers affixed to the tubule cylinder and the fastener. The tubule assembly is modifiable for use on various style wall anchors allowing for interconnection with veneer ties in varied cavity wall structures.

As will become clear in reviewing the disclosure which follows, the cavity wall structures benefit from the recent developments described herein that lead to solving the problems of insulation integrity, thermally conductive anchoring systems, and of high-span applications.

SUMMARY

In general terms, the invention disclosed hereby is a tubule assembly for varied thermally-isolating surface-mounted wall anchors and anchor assemblies for use in a cavity wall structure. The tubule assembly is a stepped cylinder with a shaftway therethrough to sheath a fastener. The stepped cylinder contains a wallboard step with a first configured open end dimensioned for insertion within the wallboard inner wythe and an insulation step with a second configured open end at the end opposite the first configured open end. The tubule assembly is affixed to the inner wythe with a fastener that is sheathed by the stepped cylinder and thermally-isolated by a series of seals which include: a wallboard seal disposed at the juncture of the wallboard step and the first configured open end; an insulation seal disposed on the insulation step adjacent the juncture of the insulation step and the second configured open end; and a tubule seal disposed about the fastener at the juncture of the fastener body and the fastener head. The fastener is self-drilling and self-tapping. The tubule assembly seals are compressible sealing washers that preclude the passage of fluids through the inner wythe. The second configured open end is workable for attachment to an anchor base.

The invention further provides for a tubule assembly with similar attributes and includes a plate-like wall anchor base with an aperture and two major faces, the mounting surface and the outer surface. The anchor base is affixed to the stepped cylinder at the second configured open end. The second configured open end is compressed against the anchor base forming a seal therebetween. The mounting surface precludes penetration of air, moisture and water vapor through the inner wythe. The outer surface contains an apertured receptor that forms a bail opening which provides an interlocking surface to receive a veneer tie. The anchor base contains at least one strengthening rib impressed in the plate-like body that is parallel to the apertured receptor. The strengthening rib is constructed to meet a 100 lbf tension and compression rating. Additional sealant means are included to provide further sealing between the anchor base and the inner wythe.

Another embodiment includes the tubule assembly with an anchor base having an aperture and two major faces, the mounting surface and the outer surface. The anchor base is affixed to the stepped cylinder at the second configured open end. The second configured open end is compressed against the anchor base forming a seal therebetween. The mounting surface precludes penetration of air, moisture and water vapor through the inner wythe. The tubule assembly includes one or more wings folded to extend in the opposite direction of the stepped cylinder. The anchor wings are disposed longitudinally along the anchor base and are slotted to permit continuously adjustable positioning of an interlocking veneer tie. The anchor base contains at least one strengthening rib impressed in the plate-like body that is parallel to the wing. The strengthening rib is constructed to meet a 100 lbf tension and compression rating. Additional sealant means are included to provide further sealing between the anchor base and the inner wythe. The use of this innovative surface-mounted wall anchor in various applications addresses the problems of insulation integrity and thermal conductivity.

It is the primary object of the present invention to provide a new and novel thermally-isolating tubule assembly for a wall anchor, which tubule assembly is secured with a fastener for securement within the inner wythe of a cavity wall.

It is another object of the present invention to provide a tubule assembly which fully supports the wall anchor.

It is yet another object of the present invention to provide an anchoring system which is resistive to high levels of tension and compression and, further, is detailed to prevent disengagement under seismic or other severe environmental conditions.

It is still yet another object of the present invention to provide an anchoring system which is constructed to maintain insulation integrity by preventing air and water penetration thereinto.

It is a feature of the present invention that the tubule assembly contains a stepped cylinder that is constructed to house a fastener that limits tearing of the insulation upon installation.

It is another feature of the present invention that the thermally-isolating tubule assembly utilizes neoprene fittings and has only point contact with the metal studs thereby restricting thermal conductivity.

It is yet another feature of the present invention that the tubule assemblies are utilizable with a variety of anchor structures allowing for connection with associated interlocking veneer ties.

Other objects and features of the invention will become apparent upon review of the drawings and the detailed description which follows.

BRIEF DESCRIPTION OF THE DRAWINGS

In the following drawings, the same parts in the various views are afforded the same reference designators.

FIG. 1 shows a first embodiment of this invention and is a cross sectional view of a tubule assembly for thermally isolating a surface-mounted wall anchor in a cavity wall including the fastener sheathed thereby;

FIG. 2 is a cross sectional view of a surface mounted anchoring system employing the thermally-isolated tubule assembly of FIG. 1 as applied to a cavity wall with an inner wythe of dry wall construction having insulation disposed on the cavity-side thereof and the fastener therein;

DESCRIPTION OF THE PREFERRED EMBODIMENTS

Figure 3:
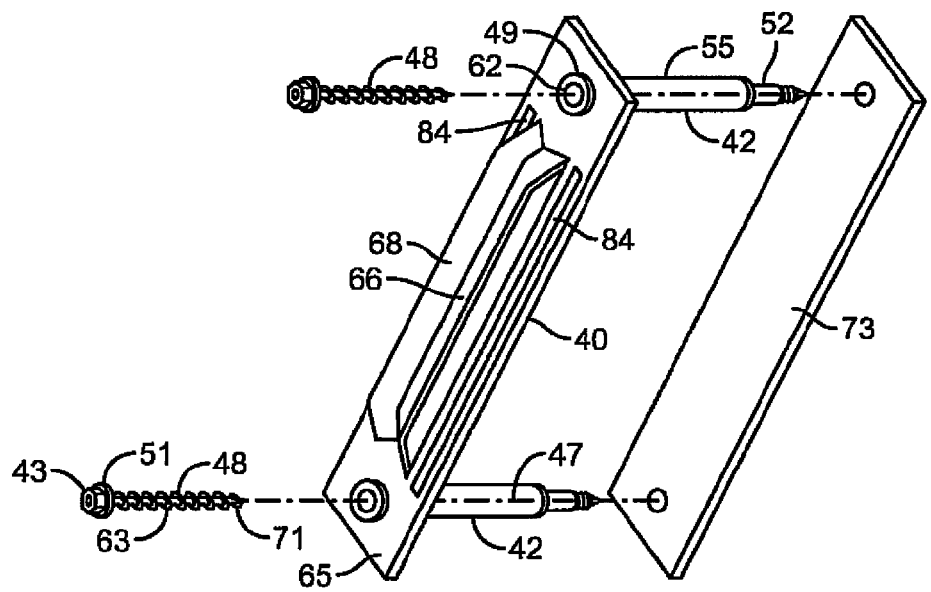
FIG. 3 is a perspective view showing the wall anchor of the surface-mounted anchoring system for a cavity wall of FIG. 2 with thermally-isolating tubule assembly for sheathing the exterior of the fastener.
Figure 4:
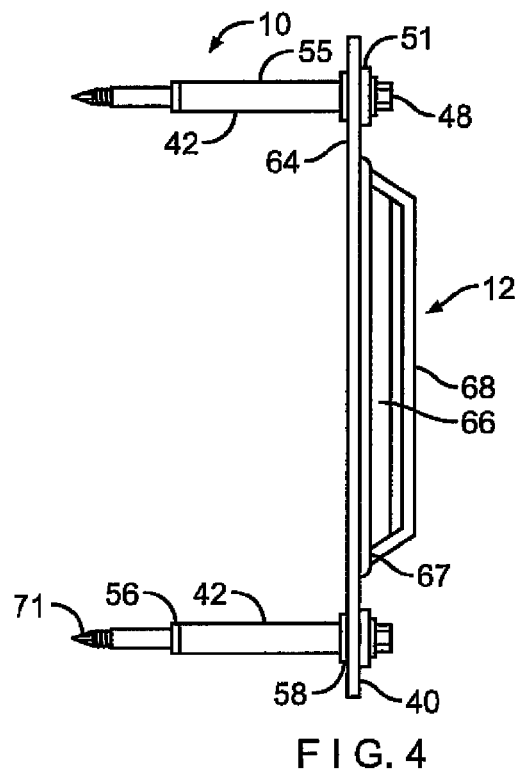
FIG. 4 is a side view of the wall anchor of FIG. 2 shown with the fastener encased in the thermally-isolating tubule assembly.

Before entering into the detailed Description of the Preferred Embodiments, several terms which will be revisited later are defined. These terms are relevant to discussions of innovations introduced by the improvements of this disclosure that overcome the technical shortcomings of the prior art devices.

In the embodiments described hereinbelow, the inner wythe is provided with insulation. In the dry wall or wallboard construction, this takes the form of exterior insulation disposed on the outer surface of the inner wythe. Recently, building codes have required that after the anchoring system is installed and, prior to the inner wythe being closed up, that an inspection be made for insulation integrity to ensure that the insulation prevents thermal transfer from the exterior to the interior and from the interior to the exterior. Here the term insulation integrity is used in the same sense as the building code in that, after the installation of the anchoring system, there is no change or interference with the insulative properties and concomitantly substantially no change in the air and moisture infiltration characteristics and substantially no loss of heat or air conditioned air from the interior. The present invention is designed to minimize invasiveness into the insulative layer.

In a related sense, prior art sheetmetal anchors have formed a conductive bridge between the wall cavity and the metal studs of columns of the interior of the building. Here the terms thermal conductivity, thermally-isolated and -isolating, and thermal conductivity analysis are used to examine this phenomenon and the metal-to-metal contacts across the inner wythe.

The term stepped cylinder as used hereinafter refers to a cylinder having cylindrical portions with differing diameters about a common longitudinal axis and having shoulders between adjacent portions or steps. The term thermally-isolated tubule or tubule assembly for thermally isolating a surface-mounted wall anchor as used hereinafter refers to a stepped cylinder that is joined to a metal base, where the base is positioned substantially at right angles (normal) to the longitudinal axis of the stepped cylinder and where at the location that the stepped cylinder joins to the base, the base surrounds the latitudinal (cross-sectional) perimeter of the stepped cylinder with some area of cylinder material extending on all sides of this joint forming a press-fit relationship. The base has two major faces, identified by the orientation presented when the veneer anchor is installed. The face oriented towards the inner wythe is identified as the base surface or mounting surface, and the face oriented towards the outer wythe is the outer surface. The stepped cylinder sheaths the mounting hardware or fastener and is thermally-isolated through the use of a series of neoprene or similar washers.

In addition to that which occurs at the facing wythe, attention is further drawn to the construction at the exterior surface of the inner or backup wythe. Here there are two concerns, namely, maximizing the strength of the securement of the surface-mounted wall anchor to the backup wall and, as previously discussed minimizing the interference of the anchoring system with the insulation. The first concern is addressed using appropriate fasteners such as, for mounting to masonry block, the properly sized concrete threaded anchors with expansion sleeves or concrete expansion bolts and for mounting to metal, dry-wall studs, self-tapping, self-drilling screws. The latter concern is addressed by the thermally-isolating fittings affixed to the stepped cylinder. The fittings seal any openings made in the insulation during installation and inhibit thermal transfer.

In the detailed description, the tubule assembly is paired with a variety of anchor bases for connection to associated interlocking veneer ties. The anchor is secured to the inner wythe through the use of fasteners or mounting hardware.

Referring now to FIGS. 1 through 4, the first embodiment shows a tubule assembly for thermally isolating a surface-mounted wall anchor. This anchor is suitable for recently promulgated standards with more rigorous tension and compression characteristics. The system discussed in detail hereinbelow, is a high-strength wall anchor for connection with an interengaging veneer tie. The wall anchor is either surface mounted onto an externally insulated dry wall inner wythe (as shown in FIG. 1) or installed onto an externally insulated masonry inner wythe (not shown). For the first embodiment, a cavity wall having dry wall and insulation mounted on metal studs or columns is chosen as exemplary.

The tubule assembly for thermally isolating a surface-mounted wall anchor in a cavity wall is referred to generally by the numeral 10. An inner wythe or dry wall backup 14 with sheetrock or wallboard 16 and insulation 26 mounted on metal studs or columns 17 is shown. The outer wythe or veneer wall forming a cavity is not shown. The tubule assembly 10 is affixed to an anchor base 40 which is apertured to interconnect with a veneer tie for placement into the bed joints of the outer wythe to secure the outer wythe against displacement.

A wall anchor 12 utilizing the tubule assembly 10 is shown having a pair of stepped cylinders 42 which penetrate the wallboard 16 and insulation 26. The stepped cylinder 42 has two or more external diameters and contains a wallboard step 52 and an insulation step 55 arrayed about a common longitudinal axis 47. The stepped cylinder 42 has a shaftway or aperture therethrough 50 to sheath a fastener 48 and is affixed to the anchor base 40, which is a stamped metal construct constructed from a plate-like body for surface mounting on inner wythe 14, and for interconnection with a veneer tie and optionally a reinforcement wire for seismic protection (not shown).

The stepped cylinder 42 is a metal leg constructed from sheet metal such as hot dipped galvanized, stainless and bright basic steel and contains a wallboard step 52 having a first configured open end 53 dimensioned to be inserted within the wallboard 16 and an insulation step 55 having a second configured open end 57 that is workable for attachment to the anchor base 40. The anchor base 40 is positioned substantially at right angles (normal) to the longitudinal axis 47 of the stepped cylinder 42 and where at the location that the stepped cylinder 42 joins to the base 40, the stepped cylinder 42 surrounds the latitudinal (cross-sectional) perimeter of the base aperture 62 with some area of stepped cylinder 42 material extending on all sides of this joint 49 forming a press-fit relationship. The base 40 has two major faces, identified by the orientation presented when the veneer anchor is installed. The face oriented towards the inner wythe is identified as the base surface or mounting surface 64, and the face oriented towards the outer wythe is the outer surface 65.

At intervals along the outer wythe surface, the tubule assemblies 10 are surface-mounted using mounting hardware such as fasteners or self-tapping or self-drilling screws 48 inserted through the stepped cylinders 42. In this structure, the stepped cylinders 42 sheath the exterior of mounting hardware 48. The fasteners 48 are thermally-isolated from the anchor 40 through the use of a series of thermally-isolating washers (wallboard seal 56, insulation seal 58 and tubule seal 51) composed of compressible nonconductive material such as neoprene. The tubule seal 51 is disposed about the fastener at the juncture of the fastener body 63 and the fastener head 43 and seals the shaftway 50. The fastener head 43 has a larger circumference than the base aperture 62 to ensure that the fastener 48 will not be displaced within the aperture 62. The head 43 is adjacent a fastener body 63 which is sheathed by the stepped cylinder 42 upon insertion to limit insulation 26 tearing. Opposite the fastener head 43 is a self-tapping or self-drilling tip 71 which is affixed to the inner wythe 14 upon installation.

The stepped cylinder 42 is cylindrical and constructed of sheet metal. An aperture or shaftway 50 runs the length of the cylinder 42 allowing for the insertion and sheathing of the fastener 48. The cylinder 42 contains a wallboard step 52 with a first configured open end 53 which is optimally located, when inserted within the outer wythe 14, at the intersection 54 of the dry wall 16 and the insulation 26 to provide a seal at such intersection 54. A thermally-isolating wallboard seal 56 is disposed on stepped cylinder 42 at the juncture of the wallboard step 52 and the first configured open end 53 thereby minimizing thermal transfer between the inner wythe 14 and the tubule assembly 10.

The anchor base 40 has an aperture 62 for connection with the stepped cylinder 42. The stepped cylinder 42 has an insulation step 55 with a second configured open end 57 at the end opposite the first configured open end 53 of the wallboard step 52 and dimensioned for insertion within the base aperture 62. The insulation step 55 extends beyond the base aperture 62 and is affixed to the base 40 through a welding, compression or similar process, thereby forming a high-strength bond. An insulation seal 58 is disposed on the insulation step 55 adjacent to the juncture of the insulation step 55 and the second configured open end 57.

The plate-like anchor base 40 contains an apertured receptor 67 formed at the outer surface of the anchor base 40 and adapted to engage a veneer tie (not shown) and adapted to limit displacement of the outer wythe toward and away from the inner wythe 14. The apertured receptor 67 optimally takes the form of a bail 68, which is substantially coplanar to the anchor base 40. A veneer tie (not shown) is inserted through the bail 68 for securement in the outer wythe.

Upon insertion of the assembly 10 into the layers of the inner wythe 14, the anchor base 40 rests snugly against the opening formed by the insertion of the stepped cylinder 42 and serves to provide further sealing of the stepped cylinder 42 insertion opening in the insulation 26 precluding the passage of air and moisture therethrough. This construct maintains the insulation integrity.

The dimensional relationship between wall anchor 40 and veneer tie limits the axial movement of the construct. The slot or bail aperture 66 of bail 68 is constructed, in accordance with the building code requirements, to be within the predetermined dimensions to limit movement of the interlocking veneer tie. The slot 66 is slightly larger horizontally than the diameter of the tie. The receptor opening or slot 66 is designed to accept a veneer tie threadedly therethrough and limit horizontal and vertical movement.

In this embodiment, as best seen in FIG. 3, optional strengthening ribs 84 are impressed in the base surface of wall anchor 40. The ribs 84 are substantially parallel to the bail opening 66 and, when mounting hardware 48 is fully seated so that the base surface 40 rests against the face of insulation 26, the ribs 84 are then pressed into the surface of the insulation 26. This provides additional sealing. While the ribs 84 are shown as protruding toward the insulation, it is within the contemplation of this invention that ribs 84 could be raised in the opposite direction. The alternative structure would be used in applications wherein the outer layer of the inner wythe is noncompressible and does not conform to the rib contour. The ribs 84 strengthen the assembly 10 and achieve an anchor with a tension and compression rating of 100 lbf. Further sealing is obtained through the use of a sealant 73 between the mounting surface 64 of the base 40 and the exterior layer of the inner wythe 14.

Figure 5:
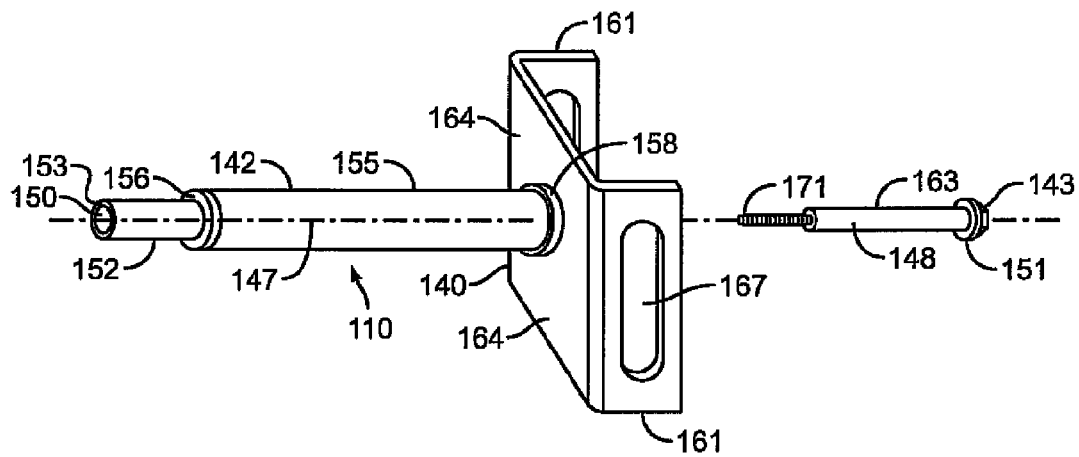
FIG. 5 is a perspective view of a second embodiment of this invention showing a double-winged surface-mounted anchoring system for a cavity wall employing the thermally-isolating tubule assembly of FIG. 1 and the associated fastener.
Figure 6:
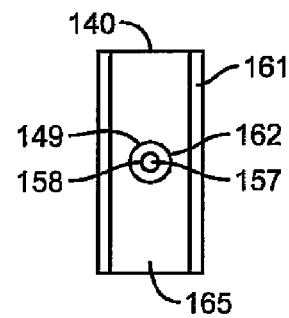
FIG. 6 is a front elevation view of the anchor of FIG. 5 showing the aperture in the anchor base and the tubule assembly.
Figure 7:
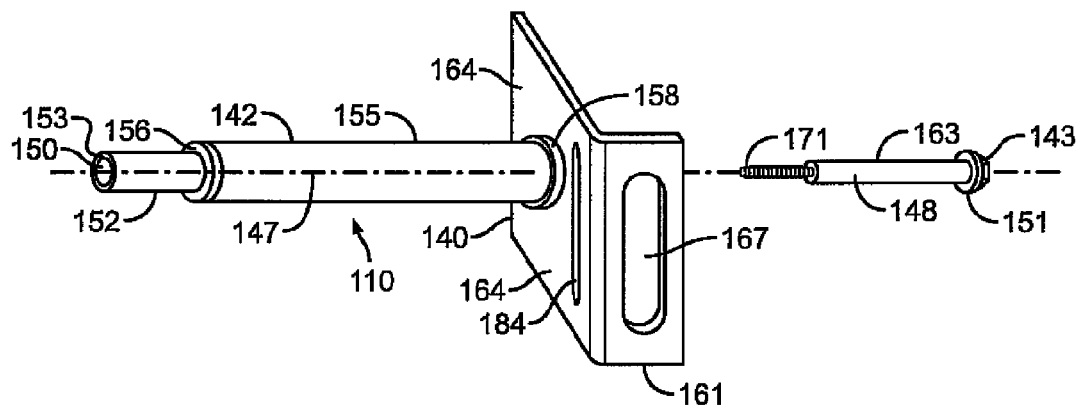
FIG. 7 is a perspective view of an anchor similar to FIG. 5 but having a single-winged surface-mounted anchoring system for a cavity wall employing the thermally-isolating tubule assembly of FIG. 1 and the associated fastener.

The description which follows is a second embodiment of the tubule assembly for thermally isolating a surface-mounted wall anchor in a cavity wall of this invention. For ease of comprehension, wherever possible similar parts use reference designators 100 units higher than those above. Thus, the stepped cylinder 142 of the second embodiment is analogous to the stepped cylinder 42 of the first embodiment. Referring now to FIGS. 5 through 7, the second embodiment of the tubule assembly is shown and is referred to generally by the numeral 110. As in the first embodiment, a wall structure similar to that shown in FIG. 1 is used herein. Optionally, a masonry inner wythe is used. Here, the anchor base has a single or double wing for connection to a veneer tie.

The tubule assembly 110 is surface mounted to the exterior surface 24 of the inner wythe 14. In this embodiment like the previous one, panels of insulation 26 are disposed on wallboard 16 and, in turn, on columns 17. Successive bed joints are substantially planar and horizontally disposed and formed between courses of bricks forming the outer wythe, are constructed to receive therewithin the insertion portion of the anchoring system construct hereof. Being surface mounted onto the inner wythe 14, the tubule assembly 110 is constructed cooperatively therewith, and as described in greater detail below, is configured to penetrate through the wallboard 16 at a covered insertion point.

A tubule assembly 110 is shown which has a stepped cylinder 142 which penetrates the insulation 26 and the wallboard 16. The stepped cylinder 142 has two or more external diameters and contains a wallboard step 152 and an insulation step 155 arrayed about a common longitudinal axis 147. The stepped cylinder 142 has a shaftway therethrough 150 to sheath a fastener 148 and is affixed to the anchor base 140. The anchor base 140 is a stamped metal construct with a plate-like body 140 which is constructed for surface mounting on inner wythe 14 and for interconnection with an interlocking veneer tie (not shown) which, in turn, optionally receives a reinforcement wire (not shown) therewithin to form a seismic construct.

The stepped cylinder 142 is a metal leg constructed from sheet metal such as hot dipped galvanized, stainless and bright basic steel and contains a wallboard step 152 having a first configured open end 153 dimensioned to be inserted within the wallboard 16 and an insulation step 155 having a second configured open end 157 that is workable for attachment to the anchor base 140. The anchor base 140 is positioned substantially at right angles (normal) to the longitudinal axis 147 of the stepped cylinder 142 and where at the location that the stepped cylinder 142 joins to the anchor base 140, the stepped cylinder 142 surrounds the latitudinal (cross-sectional) perimeter of the base aperture 162 with some area of the stepped cylinder 142 material extending on all sides of this joint 149 forming a press-fit relationship. The base 140 has two major faces, identified by the orientation presented when the veneer anchor is installed. The face oriented towards the inner wythe is identified as the base surface or mounting surface 164, and the face oriented towards the outer wythe is the outer surface 165.

At intervals along the wall surface, tubule assemblies 110 are surface-mounted using mounting hardware such as fasteners or self-tapping or self-drilling screws 148 inserted through the stepped cylinders 142. In this structure, the stepped cylinders 142 sheath the exterior of mounting hardware 148. The fasteners 148 are thermally-isolated from the anchor base 140 through the use of a series of thermally-isolating washers (wallboard seal 156, insulation seal 158, and tubule seal 151) composed of compressible nonconductive material such as neoprene. The tubule seal 151 is disposed about the fastener at the juncture of the fastener body 163 and the fastener head 143 and seals the shaftway 150. The fastener head 143 has a larger circumference than the base aperture 162 to ensure that the fastener 148 will not be displaced within the aperture 162. The head 143 is adjacent a fastener body 163 which is sheathed by the cylinder 142 upon insertion opposite to limit insulation 26 tearing. Opposite the fastener head 143 is a self-tapping or self-drilling tip 171 which is affixed to the inner wythe 14 upon installation.

The stepped cylinder 142 is at the base 140 inboard within the base 140. Upon insertion in the wallboard 16, the mounting surface 164 rests snugly against the opening formed thereby and serves to cover the opening precluding the passage of air and moisture therethrough, thereby maintaining the insulation integrity. It is within the contemplation of this invention that a coating of sealant or a layer of a polymeric compound—such as a closed-cell foam (not shown) be placed on base surface 140 for additional sealing.

The stepped cylinders 142 are cylindrical and constructed of sheet metal. An aperture 150 runs the length of the stepped cylinder 142 allowing for the insertion and sheathing of the fastener 148. The stepped cylinder 142 contains wallboard step 152 which is optimally located, when inserted within the outer wythe 14, at the intersection 54 of the dry wall 16 and the insulation 26 to provide a seal at the intersection 54. A thermally-isolating wallboard seal 156 is disposed on stepped cylinder 142 at the juncture of the wallboard step 152 and the first configured open end 153 to minimize thermal transfer between the inner wythe 14 and the tubule assembly 110.

The anchor base has an aperture 162 for connection with the stepped cylinder 142. The stepped cylinder 142 has an installation step or shoulder 155 with a second configured open end or neck 157 at the end opposite the first configured open end 153 of the wallboard step 152 and dimensioned for insertion within the base aperture 150. The insulation step 155 extends beyond the base aperture 162 and is affixed to the anchor base 140 through a welding, compression or similar process, thereby forming a high-strength bond. An insulation seal 158 is disposed on the insulation step 155 adjacent to the juncture of the insulation step 155 and the second configured open end 157.

The anchor base 140 is plate-like and has one or two slotted wing portions 161 or receptors with an apertured receptor or slot 167 for receiving an interlocking veneer tie. The anchor base 140 has two major surfaces identified by the orientation presented when the veneer anchor is installed. The surface oriented towards the inner wythe is identified as the mounting surface 164, and the surface oriented towards the outer wythe is the outer surface 165. The slotted wing portions 161 are on the outer surface and opposite the stepped cylinder 142 and affixed to the mounting surface. The slotted wing portions 161 are bent at an approximate 90 degree angle from the base 140. The opening of the slot 167 of the wing portions 161 is constructed to be within the predetermined dimensions to limit veneer tie movement in accordance with the building code requirements. The slots 167 are slightly larger horizontally than the diameter of the veneer tie.

In this embodiment, as best seen in FIG. 7, optional strengthening ribs 184 are impressed in the base surface of wall anchor 140. The ribs 184 are substantially parallel to the slot 167 and, when mounting hardware 148 is fully seated so that the base surface 140 rests against the face of insulation 26, the ribs 184 are then pressed into the surface of the insulation 26. This provides additional sealing. While the ribs 184 are shown as protruding toward the insulation, it is within the contemplation of this invention that ribs 184 could be raised in the opposite direction. The alternative structure would be used in applications wherein the outer layer of the inner wythe is noncompressible and does not conform to the rib contour. The ribs 184 strengthen the assembly 110 and achieves an anchor with a tension and compression rating of 100 lbf. Further sealing is obtained through the use of a sealant (not shown) between the mounting surface 164 of the base 140 and the exterior layer of the inner wythe 14.

In the above description of the tubule assembly for thermally isolating a surface-mounted wall anchor of this invention sets forth various described configurations and applications thereof in corresponding anchoring systems. Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

The thermally-isolating tubule assembly of this invention is a new and novel invention which improves on the prior art anchoring systems. The tubule assemblies are adaptable to varied anchor structures for use with interlocking veneer ties and reinforcement wires to provide a high-strength surface mounted anchoring system for cavity walls. The stepped cylinders sheath the mounting hardware to limit insulation tearing and resultant loss of insulation integrity. Further, the stepped cylinders are specially configured and thermally-isolated through the use of a series of strategically placed neoprene fittings which serve to disrupt thermal conductivity between the anchoring system and the inner wythe.

What is claimed is:

1. A tubule assembly for thermally isolating a surface-mounted wall anchor in a wallboard inner wythe having insulation thereon, said tubule assembly comprising:
    a stepped cylinder having steps arrayed about a common longitudinal axis having two or more external diameters, said stepped cylinder having a shaftway therethrough to sheath a fastener, said stepped cylinder further comprising:
        a wallboard step having a first configured open end, said wallboard step dimensioned for insertion within said wallboard; and
        an insulation step having a second configured open end at the end opposite said first configured open end, said second configured open end is workable for attachment to a wall anchor base;
    a wallboard seal disposed on said stepped cylinder at the juncture of said wallboard step and said first configured open end;
    an insulation seal disposed on said insulation step adjacent the juncture of said insulation step and said second configured open end;
    a plate-like wall anchor base having a single centrally located aperture and two major faces being the mounting surface and the outer surface, said mounting surface adapted to preclude penetration of air, moisture and water vapor through said inner wythe, said anchor base affixed through said aperture to said second configured open end;
    a fastener dimensioned for insertion in said stepped cylinder, said fastener further comprising:
        a fastener head;
        a fastener body adjacent said head; and
        a fastener tip adjacent said body and opposite said head, said tip dimensioned to be affixed in said inner wythe; and
    a tubule seal disposed about said fastener at the juncture of said fastener body and said fastener head;
    whereby upon attaching said anchor base to said second configured open end, said second configured open end is compressed against said anchor base forming a seal therebetween.

2. A tubule assembly as described in claim 1, wherein said insulation seal, said wallboard seal and said tubule seal are thermally isolating and constructed of compressible nonconductive material precluding the passage of fluids through said inner wythe.

3. A tubule assembly for thermally isolating a surface-mounted wall anchor in a wallboard inner wythe having insulation thereon, said tubule assembly comprising:
    a stepped cylinder having steps arrayed about a common longitudinal axis having two or more external diameters, said stepped cylinder having a shaftway therethrough to sheath a fastener, said stepped cylinder further comprising:
        a wallboard step having a first configured open end, said wallboard step dimensioned for insertion within said wallboard; and
        an insulation step having a second configured open end at the end opposite said first configured open end of said wallboard step, said second configured open end is workable for attachment to a wall anchor base;
    a wallboard seal disposed on said stepped cylinder at the juncture of said wallboard step and said first configured open end;
    an insulation seal disposed on said insulation step adjacent the juncture of said insulation step and said second configured open end;
    a wall anchor base having a single centrally located aperture and two major faces being the mounting surface and the outer surface, said mounting surface adapted to preclude penetration of air, moisture and water vapor through said inner wythe, said anchor base affixed through said aperture to said second configured open end;
    one or more wings folded to extend in the opposite direction of said stepped cylinder and disposed longitudinally along said wall anchor base, said one or more wings each having an aperture dimensioned to receive a veneer tie;
    a fastener dimensioned for insertion in said stepped cylinder, said fastener further comprising:
        a fastener head;
        a fastener body adjacent said head; and
        a fastener tip adjacent said body and opposite said head, said tip dimensioned to be affixed in said inner wythe; and
    a tubule seal disposed about said fastener at the juncture of said fastener body and said fastener head;
    whereby upon attaching said anchor base to said second configured open end, said second configured open end is compressed against said anchor base forming a seal therebetween.

4. A tubule assembly as described in claim 3, wherein said insulation seal, said wallboard seal and said tubule seal are thermally isolating and constructed of compressible nonconductive material precluding the passage of fluids through said inner wythe.

5. A tubule assembly as described in claim 4, wherein said wall anchor base is a plate-like body having at least one strengthening rib impressed in said plate-like body parallel to said one or more wings, said strengthening rib constructed to meet a 100 lbf tension and compression rating.

6. A tubule assembly as described in claim 5, wherein said fastener tip is self-drilling and self-tapping.

7. A tubule assembly as described in claim 6, wherein said tubule assembly further comprises:
    sealant means for further sealing between said plate-like body and said inner wythe.

* * * * *